United States Patent Office 3,168,396
Patented Feb. 2, 1965

3,168,396
RECOVERY OF MINERAL VALUES FROM ORE
Lyle M. Barker, Santa Rosa, Calif., assignor to Phelps Dodge Corporation, New York, N.Y., a corporation of New York
No Drawing. Filed Feb. 21, 1961, Ser. No. 90,622
20 Claims. (Cl. 75—108)

This invention relates to a process for the recovery of mineral values from ore. More particularly this invention relates to a leaching process for the recovery of mineral values which are not recoverable efficiently by the usual processes for the beneficiation of ore and which is especially well suited to the recovery of acid-soluble copper minerals such as oxide copper values associated with sulfide copper minerals in ores containing acid insoluble gangue minerals.

It has long been customary in the processing of mineral bearing ores to utilize a flotation process to concentrate and facilitate recovery of the desired minerals. When, as is often the case, the minerals are present in several forms, valuable mineral values are lost in the tailings unless, before the ore is subjected to the flotation process, the ore is treated to convert the otherwise unrecoverable mineral values to forms which respond to the flotation process. An alternate process involves reprocessing the tailings but the cost involved is usually excessive.

For example, in the case of copper bearing ores, most of the copper is usually present as a sulfide which is recovered by means of a flotation process but significant oxide copper values are lost because they do not respond to this flotation process directed to the concentration of sulfide copper.

Recovery of oxide copper values from the tailings has not proven to be economically feasible because of the expense involved. While the advantages to be gained from the conversion of the oxide copper values to the sulfide of copper before subjecting the ore to flotation are obvious, processes hitherto proposed and utilized for this purpose have left much to be desired.

For example, as proposed in U.S. Patent No. 1,333,688 and Patent No. 1,178,191, oxide copper values in the ore are dissolved by a solvent and by using a precipitant the sulfide of copper is precipitated and then recovered by flotation. This process as well as others hitherto known, involving using first leaching reagents then a precipitant followed by flotation, have required such expensive installations of equipment as well as excessively large quantities of the reagents and water as to be impractical from the economic point of view for most recovery operations.

Another serious disadvantage of conventional leaching processes, in which the ore is suspended by agitation during leaching and the leach solutions are subsequently separated from the solid ore particles prior to recovery of the dissolved values, is the high cost of the liquid-solid separation. Classification, thickening, and filtration have proven to be expensive and not always efficient for this purpose. The large amounts of slimes created during crushing and grinding of the ore to a size fine enough to allow suspension by agitation, and additional slimes created by attrition and chemical action during leaching, markedly increase the cost and inefficiency of this operation. The large amounts of liquid hitherto required for such leaching and washing operations, and the large equipment and space requirements, are further serious disadvantages.

In the case of the recovery of oxide copper values, the precipitants utilized to recover the dissolved copper values have left much to be desired. Metallic iron in a suitable form such as sponge iron has been utilized to precipitate the dissolved copper as metallic copper. The use of sponge iron as a precipitant on a commercial basis requires a low cost source of metallic iron because of the relatively large amounts consumed in the process and, even when such a source of metallic iron is present, the process is nevertheless relatively expensive. The amount of iron required to effect the copper precipitation is ordinarily several times that required stoichiometrically and in addition prolonged agitation in spite of its attendant difficulties is necessary to insure efficient precipitation. Then too, recovery and recycling of unreacted sponge iron is often required. In practice, the copper bearing leach solutions of necessity are separated from the bulk of the ore before precipitation with sponge iron because the copper precipitate produced by that precipitant does not respond satisfactorily to the process conditions employed in the flotation recovery of naturally occurring copper sulfides. It must be recovered in a separate operation under different process conditions, which is a further disadvantage.

It has also long been proposed to utilize ferrous sulfide (FeS) to precipitate copper from its solutions as well as a precipitant which contains both ferrous sulfide and calcium sulfide prepared by heating pyrites with an equivalent of lime in the absence of air. The reactions involving ferrous sulfide as a precipitant are relatively slow and, in addition, the large quantities of free acid required, in turn, necessitate the use of large amounts of neutralizer in order to effect satisfactory recovery by means of flotation.

In accordance with an important feature of the present invention, the crushed ore mass is treated with a minimum of liquid leaching reagent. The amount of liquid reagent utilized during the leaching process is so small that the moistened ore can be carried by the usual conveying apparatus utilized in transporting dry ore to and from the storage bins which are customarily provided in continuously operated plants. This results in a marked savings in that considerably less leaching reagents are used per ton of ore and, also, the need for special equipment to handle the moistened ore as well as the large quantities of water hitherto considered to be necessary in the operation of such installations are avoided. Leaching of the crushed ore mass may be carried out in accordance with the present invention with little or no agitation other than that which occurs incident to the normal transportation of the ore. Thus, there is avoided the need for agitating equipment and the formation of slimes is minimized, slimes being particularly undesirable when the dissolved values are to be separated from the bulk of the ore solids before precipitation.

A further important feature of the present invention in the recovery of oxide copper values resides in the preparation and use of a precipitant the active ingredient of which is calcium sulfide (CaS) and which is effective to precipitate copper rapidly in the presence of an exceedingly low free acid concentration. The reaction time and the free acid concentration required are so low that the reaction is completed long before ferrous sulfide, if any is present, could be effective as a precipitant because of the greater free acid concentration and time required by the latter.

Further features as well as objects and advantages of the present invention will be apparent to those skilled in the art from the following detailed description. While the present invention will be described primarily with regard to the recovery of oxide copper values from copper ores, it is also applicable to the recovery of other metal values from their ores by solvent leaching and variations in the carrying out of the present invention will be apparent to those skilled in the art.

The present invention comprises a process in which the ore mass, such as a copper bearing ore, is moistened by contact with an aqueous leaching solution, an aqueous acid solution in the case of copper ores, to convert the desired metal values to a soluble salt of the metal. Following this, water is added to the solvent treated ore to bring it to normal grinding slurry density and a precipitant is added to this slurry. When a copper ore is being treated, the preferred precipitant in the form of calcium sulfide or calcium sulfide and metallic iron is added to the slurry to precipitate the dissolved copper as copper sulfide and also metallic copper when both calcium sulfide and metallic iron are used together as the precipitant. In the presence of the calcium ions, the copper sulfide tends to flocculate or clump together thereby facilitating subsequent flotation processing. Conventional methods for the flotation processing of sulfide copper ores may then be utilized with the resulting recovery in the concentrate of both the sulfide copper minerals originally present and the now precipitated oxide copper values, and, particularly in the case of the metallic copper precipitate, separate flotation treatments for the recovery of the precipitate and of the naturally occurring copper sulfides in the ore are avoided.

In the process of this invention, the ore is first subjected to a crushing operation to reduce the size of the ore particles utilizing any of the conventional crushing methods. Crushing to an average particle size of about ⅜ of an inch with a relatively small amount of fines has been found suitable. The crushed ore, including the fines, is then treated with a leaching solution.

In treating the crushed ore with a leaching solution the ore is moistened as by spraying with a sufficient quantity of the solution so that the resulting pulp has a moisture content ranging from about 5 to 20%. Spraying of the leaching solution on to the crushed ore is conveniently carried out as the ore leaves the crushing machinery and when it is being carried by means of the usual crushed ore conveyors to the storage bins; the storage bins serving as convenient reaction vessels. No mixing is required other than that which normally occurs in chutes and at transfer points during the delivery of the ore from the crushing machinery to the conveyors and from the conveyors to the storage bins. When the leachings are to be separated from the ore mass for further processing, violent or severe mixing is to be avoided during the leaching step because experiments have shown that such mixing is conducive to the formation of an undesirable slime.

The leaching solution contemplated by this invention during the leaching treatment described for oxide copper recovery is composed essentially of an aqueous solution of a mineral acid, such as sulfuric, hydrochloric or hydrobromic acid. Sulfuric acid has been found to be especially useful. Aqueous acid leaching solutions are suitable for other ores, such as vanadium and uranium ores. Alkaline carbonate and bicarbonate solutions are suitable for some uranium ores. In the case of gold and silver ores, aqueous alkali cyanide solutions may be employed. Tin concentrates may be leached with a hydrochloric acid solution.

The effect of the leaching solution as utilized in this invention is twofold. The reactive component acid in the case of the copper bearing ores, reacts with some of the compounds in the ore, such as copper oxide, to form a water-soluble salt, such as cupric sulfate, cupric chloride, etc. The water constituent, in moistening the ore in the absence of excessive agitation, causes an agglomeration of the ore. By agglomeration is meant the tendency of the fine ore particles to be associated with the relatively larger ore particles. This agglomeration of the ore preferably occurs while the ore mass, after it has been contacted with leaching solution, is being conveyed to and during its residence in the storage bin. The amount of water in the leaching solution required to achieve the condition of agglomeration will be somewhat affected by the type of ore and the particle size. With copper ores crushed to an average particle size of about ⅜ of an inch, the optimum amount of water is that amount sufficient to increase the total moisture content of the ore mass to about 6 to 8%. Ore crushed to pass through an eight mesh screen requires, as an optimum amount of water, an amount sufficient to increase the total moisture content to about 8% to 11%, while ore crushed to a size which passes through a 65 mesh desirably employs an amount of water to increase the total moisture content to about 18%. In any event, the moisture content of the moistened ore mass is kept less than that at which the liquid would tend to separate from the bulk of the solid ore under the influence of gravity.

The moistened ore mass is permitted to stand in the storage bin at room or ambient temperature. A contact time of about one to three hours has been found the most desirable for permitting the leaching solution to react with the copper compounds in the case of a copper ore while contact times of shorter or longer duration may be required for the leaching solution to react with the leachable compounds in other ores.

The substantially reduced quantity of acid or alkaline reagent required to extract the soluble ore compounds from the ore mass characteristic of the present process may be attributed to the small amount of water employed, which provides a leaching solution of high concentration with a minimum amount of acid or alkali, as well as the high degree of mobility of ions in such a small volume of solution. Thus, the quantity of solution utilized may be effectively regulated to favor agglomeration of the ore and minimize the formation of slime. The concentration of the leach solution is determined both by the acid or alkali consuming capacity of the ore and the ultimate concentration of acid or alkali required during further processing following completion of the leaching operation.

Following the leaching treatment, the leachings may be washed from the ore mass and may be passed on separately to a precipitation station where, in the case of a copper bearing ore, the copper may be recovered as metallic copper by precipitation with metallic sponge iron. The ore mass after drainage may then be treated in keeping with customary flotation procedures to recover the remaining copper values which are primarily in sulfide form.

Preferably, in the case of copper bearing ores, the separate treatment of the leachings on the one hand and the leached and washed ore on the other hand is avoided in accordance with the present invention by utilizing a preferred precipitant which provides a precipitate which may include, in addition to an insoluble salt of the element some of the element itself in metallic form. Thus, in the case of copper, the precipitate in addition to sulfide copper may also include metallic copper precipitated due to the presence of metallic iron in the precipitant. This metallic precipitate, formed in the presence of calcium sulfide, responds well to conventionally utilized sulfide copper mineral flotation treatment and reagents usually utilized in effecting such flotation treatment.

The novel precipitant of the present invention in which calcium sulfide is essentially the active constituent may be prepared by heating pyrite with an excess of lime at a temperature ranging from about 1300° F. to about 1900° F. for from 1 to 6 hours. Optimum results are achieved when the reaction is carried out at a temperature of about 1500° F. to 1600° F. and preferably a temperature in this range is used. The reaction is preferably carried out in a neutral or reducing atmosphere such as that produced by burning gaseous or liquid fuel with somewhat less air than is required for complete combustion. The reagents may be used in such forms as may be convenient. For example, the lime may be present as burned lime or as limestone. Preferably the pyrite and lime are present in the mixture which is heated in such proportions that the mole ratio of pyrite to CaO is in the range of about 0.40 to 0.50 or about one to two. The reaction product is cooled to at least about 700° F. out of contact with air to avoid the possibility of re-oxidation and consequent loss of precipitating value.

Ferrous sulfide formed during the reaction reacts with the excess lime to augment the amount of calcium sulfide. The reaction which takes place may be represented by the following equations:

$$6FeS_2 + heat = 6FeS + 6S$$
$$4S + 4CaO = 3CaS + CaSO_4$$
$$6FeS + 2S + 8CaO = 8CaS + 2Fe_3O_4$$

These equations may be combined as follows:

$$6FeS_2 + 12CaO = 11CaS + 2Fe_3O_4 + CaSO_4 \quad (1)$$

Theoretically, in accordance with Equation 1, this reaction should produce a product containing 57% calcium sulfide, 10% calcium sulfate and 33% iron oxide ($Fe_3O_4$). However, in practice the product contains some unreacted ferrous sulfide and lime and in addition volatile sulfur may be lost. Thus, a typical product produced was found, upon analysis, to have the following composition: ferrous sulfide 11%, calcium sulfide 40%, calcium sulfate 5%, iron oxide 24% and calcium oxide 17%. Such a product rapidly precipitates copper from its solutions in the presence of a much lower free acid concentration than could be successfully utilized hitherto.

The precipitation reaction for a copper sulfate solution containing about 0.1 to 0.3% copper sulfate and a sulfuric acid concentration as low as about 0.2% (pH 1.5) with the precipitant of the present invention is theoretically represented by the equation $$CuSO_4 + CaS + FeS \xrightarrow{[H_2SO_4]} CuS + CaSO_4 + FeS \quad (2)$$

From Equation 2 it is apparent that calcium sulfide is the active constituent and under the conditions of acidity and time at which the reaction is carried out, the ferrous sulfide which may be present is, for all practical purposes, no more than an unreacted diluent in the precipitant. In practice, 0.35 to 0.4 pound of copper has been precipitated per pound of precipitant used.

The rapidity with which the reaction of Equation 2 takes place, about one to three minutes, and the low acid concentration required are highly advantageous. The acidity required for precipitation is substantially that resulting from the residual free acid in the acid leached ore mass. Thus, it is normally not necessary to add additional acid.

In accordance with a further feature of the present invention, a novel precipitant is prepared in which calcium sulfide and metallic iron are the active constituents when pyrite, lime and carbon are heated to at least about 1500° F. and preferably to 1800° F. or above, in the proportion of about one mole of pyrite to two moles of lime with an amount of carbon, preferably as charcoal or coal, equivalent to the oxygen content of the other reagents. The reaction is carried out in a neutral or reducing atmosphere and the reaction product is cooled to at least about 700° F. out of contact with air to avoid the possibility of re-oxidation and consequent loss of precipitating value. The reaction may be represented as follows:

$$FeS_2 + heat = FeS + S$$
$$S + CaO + C = CaS + CO$$
$$FeS + CaO = CaS + FeO$$
$$FeO + C = Fe_m + CO$$

which may be combined as $$FeS_2 + 2CaO + 2C = 2CaS + Fe_m + 2CO \quad (3)$$

This reaction has a theoretical yield in the form of solids of 72% calcium sulfide and 28% metallic iron. In practice, small amounts of unreacted ferrous sulfide and lime remain as diluents in the product. A typical product may have the following composition: ferrous sulfide 5%, calcium sulfide 60%, metallic iron 23% and lime 7%. A substantially larger proportion of the sulphur is converted to calcium sulfide while the iron is converted to the metallic form. This reduced precipitant reacts with a copper sulfate solution as rapidly and at the same low acid requirements characteristic of the unreduced precipitant prepared in accordance with Equation 1 to precipitate about 0.75 to 0.85 pound of copper per pound of precipitant utilized.

The feed mixture of pyrite and lime utilized in preparing the unreduced and the reduced precipitants preferably contains the pyrite and lime in the form of fine particles obtained by grinding to a size small enough to pass through a 100 mesh screen. While a coarser grind may be used or the grinding of the constituents of the feed mixture may be omitted, it is important that the reaction product, in which calcium sulfide alone or with metallic iron is the active precipitant, be made up of small or fine particles in order to achieve the most rapid precipitation of the copper described herein. Grinding the reaction product to a fineness to pass through about at least a 65 to a 100 mesh screen provides in practice, the particle size suitable for attaining the desired result.

In preparing the unreduced and the reduced precipitants care is taken to avoid the loss of volatile intermediate products, such as sulfur and carbon monoxide, particularly where these products are prepared by a continuously operated process during which the reagents are reacted while in motion.

EXAMPLE 1

In the preferred embodiment of the invention, demonstrating application of the process to a copper ore, the crushed ore mass is moistened with the leaching solution as it is conveyed from the crusher to the ore bins. One starting ore is a porphyry ore containing about 0.77% sulfide copper, 0.13% oxide copper, 40% silica (as quartz), 30% feldspar, 15% clay, 3.5% pyrite and the remainder inert materials. Normally, the agitation of the ore incident to feeding the ore from the crusher and conveying it to and into the ore bins is sufficient to wet the ore with the leach solution to the desired uniform degree.

It has been found that with a ton of copper ore, about 8 pounds of sulfuric acid is sufficient as to the acid component. The water accompanying this quantity of acid should be sufficient to increase the moisture content of the ore, based on an as-is basis, to about 8%. The amount of leach solution used is such as to permit satisfactory handling of the moistened ore by the conventional ore feeders, bins and conveyors. In determining the quantity of acid to be used, account is taken both of the acid consuming capacity of the ore and the pH desired after leaching has been completed and the ore mass is further diluted with water to normal grinding slurry density in preparation for the addition of the precipitant.

The ore mass moistened with the leach solution is stored for about one hour in the usual crushed ore bins at ambient temperature. Then the moistened ore mass is withdrawn from the ore bins and fed to a conventional paddlescrew mixer where it is pulped with water to normal grinding slurry density, about 70 to 75% solids. In this state, the residual free acid content of the slurry is about 0.2% to 0.4% sulfuric acid, pH 1 to 2. Thus, both the optimum acidity and optimum density are provided for the precipitation and grinding which thereafter follow.

When the slurry attains the proper mixture of solids and water, the solid precipitant may be added. An excess of precipitant, either the unreduced precipitant of Equation 1 or the reduced precipitant of Equation 3, slightly over the amount required stoichiometrically, is used to assure complete precipitation of the copper. While both the unreduced and the reduced precipitants are only slightly soluble in water, either one rapidly reacts in the presence of the free acid contained in the slurry. The unreduced precipitant reacts to precipitate the soluble copper as the sulfide. The reduced precipitant yields both metallic copper and the sulfide.

The slurry with the precipitant added is agitated for about three minutes and is then ready for processing in the usual way by well known flotation processes for sulfide copper ores with the resulting recovery in the concentrate of the original copper sulfide minerals and, in addition the precipitated acid soluble copper. Completion of the precipitation may be recognized by a change in the oxidation-reduction potential of the mass. It has been found in practice that the excess of precipitant added to the slurry aids in depression of pyrite during the flotation operation. Upon completion of the precipitation, the pulp may be made alkaline by addition of milk of lime before the usual grinding which precedes flotation. Under certain conditions, as when the pyrite can be effectively depressed, the lime additions may be omitted and grinding and flotation can be carried out with a pH of less than 7.

EXAMPLE 2

In another illustration of the preferred embodiment of the invention, demonstrating application of the process to a copper ore, the starting ore is a porphyry ore containing 1.00% total copper, 0.16% non-sulfide copper, 2.25% pyrite, with the remainder of the gangue being silica in the form of quartz, feldspar, and clay. The ore is first crushed to pass an 8 mesh screen and then is moistened with a sulfuric acid solution containing the equivalent of eight pounds of sulfuric acid per ton of ore and an amount of water adequate to bring the total moisture content of the ore to 8% by weight.

The moistened ore sample is allowed to stand without agitation for a period of one hour and at the end of this period the ore sample is diluted with water to form a slurry containing 75% solids by weight and stirred slowly for two minutes. To this slurry, which has a pH of 1.5, an amount of the reduced type of precipitant equivalent to 3.6 pounds per ton of ore is added, the precipitant having been made by heating a mixture of pyrite, lime and coal as herein described to produce a precipitant which precipitates 0.68 pound of copper per pound of precipitant.

After slowly stirring the ore slurry and precipitant mixture for four minutes, an amount of milk of lime adequate to raise the alkalinity of the slurry to the normal flotation level for copper sulfide ore (pH 10) is added, and the ore is ground to flotation size in the usual manner. Then the ground slurry is subjected to flotation employing the equivalent of 0.060 pound of sodium aerofloat and 0.45 pound of cresylic acid flotation reagents per ton of ore.

The ore treated as set forth yielded 85.4% of the total copper contained in the ore, the concentrate containing 15.7% copper.

EXAMPLE 3

In another illustration of the preferred embodiment of the invention demonstrating application of the process to a copper ore, the starting ore contains 1.10% total copper, 0.17% non-sulfide copper, 3.88% pyrite, with the remaining gangue being silica in the form of quartz, feldspar and clay. The ore is passed through a crusher set at ¼ inch and is slowly mixed with dilute sulfuric acid solution at a rate equivalent to eight pounds of sulfuric acid per ton of ore, together with enough water to provide a final moisture content of 8% by weight. The moistened ore is discharged into a bin of such size that normal residence time therein is one to two hours at which time the moistened ore is withdrawn from the bin via a belt conveyer and discharged into a mixing vessel of the paddlescrew mixer type. As it enters the mixer, the ore is diluted with water to 76.3% solids by weight. Midway between the feed and discharge points of the paddlescrew mixer a precipitant of the reduced type herein described is added in an amount equivalent to 4.7 pounds per ton of ore.

The mixture of leached ore and precipitant as it leaves the paddlescrew mixer has a pH of 1.7 and is discharged into a conventional ball mill and classifier grinding circuit in which milk of lime is added to achieve the desired flotation alkalinity. Further processing is carried out by usual flotation procedures employing the reagents of Example 2.

Copper extraction averaged 88.4% in a concentrate containing 24.5% copper.

The copper flotation concentrate may be advantageously roasted to produce sulfuric acid for use as the acid component in the leach solution and a copper product for smelting. In the case of ores containing pyrite, a pyrite concentrate may be obtained from the copper flotation tailing by conventional flotation or other processes which serves as a raw material for preparation of the precipitate.

It has been found that when copper ore containing oxide values is treated according to the process of this invention, the quantity of copper recovered compares well with that recovered by other commercial processes employing leaching and flotation, while the marked reduction in the quantities of reagents and water required and the fact that less equipment is needed than normally required to carry out conventional processes for the beneficiation of such ores results in a marked reduction in the cost per pound of recovering the copper.

It will be understood that while the leaching of ores in accordance with the present invention has been described primarily in connection with the recovery of oxide values from copper ores, it is applicable as well for use with other ores, particularly those ores which when crushed produce substantial amounts of fines. The applicability of the leaching process described to ores containing metals other than copper, as vanadium, uranium, gold, silver and tin, is also encompassed and included within the scope of this invention. The amount of aqueous leaching solvent required to properly react with the leachable component and the amount of water required to achieve the condition of agglomeration may be varied and such amounts should be obvious to a person skilled in the art practicing the invention in accordance with the principles disclosed. Examples of the extraction of valuable metals other than copper from their ores will be described in the examples which follow.

EXAMPLE 4

This example describes the extraction of uranium from an ore with an aqueous acid leaching solution.

The leaching procedure described in Example 1 is employed, but the starting ore is a uranium ore containing 0.4% $U_3O_8$ as uraninite. The ore is crushed until it passes through a 28 mesh screen. The ore is then leached with sufficient aqueous solution of sulfuric acid to increase the moisture content of the ore to 14%, with the leaching solution containing sufficient sulfuric acid to constitute 100 pounds per ton of ore. The ore is permitted to stand with the solution of sulfuric acid for 16 hours. The ore is then washed with water and filters rapidly providing a clear filtrate. Approximately 56.7 pounds of sulfuric acid for each ton of ore is consumed and 94.3% of the uranium is extracted from the ore.

EXAMPLE 5

This example describes the extraction of uranium from an ore with an aqueous alkaline carbonate solution.

The leaching procedure described in Example 1 is employed, but the starting ore is a uranium ore containing 0.53% $U_3O_8$ as uraninite. The ore is first crushed until it passes through a 28 mesh screen. The ore is then leached with sufficient aqueous alkaline carbonate solution to increase the moisture content of the ore to 15%, with the solution containing 62.4 pounds of sodium carbonate and 15.6 pounds of sodium bicarbonate for each ton of ore. The ore is then washed with water and filtered. Approximately 78.8% of the uranium is extracted from the ore.

EXAMPLE 6

This example describes the extraction of gold and silver from an ore using an aqueous cyanide leaching solution.

The leaching procedure described in Example 1 is employed, but the starting ore is a gold and silver ore containing the following contents of valuable metals:

| | |
|---|---|
| Gold _____ oz. per ton__ | 0.328 |
| Silver _____ do____ | 10.91 |
| Copper _____ percent__ | 0.25 |
| Lead _____ do____ | 0.32 |
| Zinc _____ do____ | 0.47 |

The ore is first crushed until it passes through a 48 mesh screen. The ore is then leached with sufficient aqueous solution of potassium cyanide to increase the moisture content of the ore to 14%, with the cyanide solution containing 10.2 pounds of potassium cyanide per ton of ore. The ore is permitted to stand with the aqueous potassium cyanide solution for 17 hours. The ore is then washed with water and filtered. Approximately 4.8 pounds of potassium cyanide for each ton of ore is consumed and 88.4% of the gold and 75% of the silver is extracted from the ore.

The preparation of the unreduced precipitant and the reduced precipitant will be described in the following examples.

EXAMPLE 7

This example describes the preparation of an unreduced precipitant for use in the recovery of copper from its ore.

A mixture of pyrite flotation concentrate ground to pass through a 100 mesh screen, containing 45.9% iron, 52.3% sulfur, 0.10% copper and 1.25% silica, and reagent grade lime ground to pass through a 100 mesh screen containing 68.8% total calcium, 66.5% calcium as $CaO+Ca(OH)_2$, and 1.8% calcium as $CaCO_3$, in the proportions of one mole of pyrite to two moles of lime, is heated for one hour at 1500° F. in a sealed electrically heated furnace in a neutral nitrogen atmosphere. The reaction product is then cooled to room temperature out of contact with air, and ground to a size passing a 100 mesh screen. The resulting reaction product contains about 38% calcium sulfide and is effective to precipitate from dilute copper sulfate solutions in the presence of a sulfuric acid concentration of 0.2%, pH 1.5, 0.36 gram of copper for each gram of reaction product consumed. The unreacted lime in the reaction product serves to neutralize some of the residual free acid which would otherwise be present in the slurry formed following the acid leaching step during the recovery of copper from its ores.

In preparing the unreduced precipitant, when the mixture of pyrite and lime is heated at a temperature of less than about 1300° F., the resulting product has little or substantially no effect in precipitating copper under the conditions described in connection with Example 7. Precipitants prepared by heating the pyrite and lime between about 1500° F. and 1600° F. are most effective while reaction temperatures as high as 1700° F. to 1900° F. result in a less effective product. This is apparent from Examples 8–14 set forth in Table I which, except for the temperature and duration of heating, were prepared as described in Example 7. In Table I, the temperature and heating time used for each example is given together with the amount of copper in grams precipitated, per gram of reaction product consumed, from dilute copper sulfate solutions in the presence of the same amount of sulfuric acid as in Example 7.

*Table I*

| Ex. No. | Temp., °F. | Heating Time, Hrs. | Percent CaS | Precipitating Value, gms. Cu/gm. Product |
|---|---|---|---|---|
| 8 | 1,200 | 1 | 16.6 | 0.14 |
| 9 | 1,300 | 1 | 30.4 | 0.27 |
| 10 | 1,400 | 1 | 25.1 | 0.22 |
| 11 | 1,500 | 3 | 40.4 | 0.37 |
| 12 | 1,600 | 3 | 47.5 | 0.41 |
| 13 | 1,700 | 3 | ---------- | 0.34 |
| 14 | 1,900 | 3 | ---------- | 0.32 |

EXAMPLE 15

This example describes the preparation of unreduced precipitant from industrial grade raw materials.

A mixture of 48% by weight of a pyrite flotation concentrate, containing 98% $FeS_2$ and minor amounts of copper and silica, and 52% commercial burnt lime containing 60.2% total calcium with minor amounts of MgO and silica, is mixed and ground to pass a 100 mesh screen. The mixture is then heated to about 1600° F. in a natural gas fired furnace for one-half hour with the gas and combustion air proportioned to provide a non-oxidizing atmosphere in the furnace. The reaction product is cooled to 700° F. in the non-oxidizing atmosphere before being exposed to air and ground to minus 100 mesh. This product precipitates 0.42 gram of copper per gram of product consumed under the precipitation conditions of Example 7.

EXAMPLE 16

This example describes production of the unreduced precipitant in a continuous operation.

A mixture of 45% pyrite flotation concentrate, containing about 98% $FeS_2$, and 55% commercial burnt lime, ground to 80% passing a 100 mesh screen, is passed through an internally fired rotary kiln type furnace operated at a maximum temperature of 1580° F. and fired with natural gas and air proportioned to provide a non-oxidizing atmosphere. The mixture is passed through the furnace at a rate to provide a residence time in the furnace of approximately three hours. The reaction product passes from the furnace into a non-oxidizing natural gas atmosphere where it is cooled. The cooled reaction product is ground to pass a 100 mesh screen. The product contains 44% CaS and precipitates 0.38 gram of copper per gram of product consumed under the precipitation conditions of Example 7.

EXAMPLE 17

This example describes production of the unreduced precipitant from unburned limestone and pyrite.

A mixture of 37.7% pyrite flotation concentrate, containing 98% $FeS_2$, and of 62.3% run of mine limestone, containing 95.0 calcium carbonate, is ground to pass a 100 mesh screen. The ground mixture is heated to 1800° F. for one-half hour under the same conditions as described in Example 15, and then cooled to 700° F. out of contact with air. The reaction product obtained, after being ground to pass a 100 mesh screen, precipitates 0.40 gram of copper per gram of product consumed under the conditions of Example 7.

EXAMPLE 18

This example describes the preparation of a reduced precipitant for use in the recovery of copper from its ore.

A mixture of finely ground pyrite flotation concentrate and chemically pure lime in the proportions of Example 7, but containing 10.1% by weight of charcoal, is heated to 1800° F. for one hour under the conditions of Example 7. The reaction product is cooled to room temperature out of contact with air and ground to pass a 100 mesh screen. The product thus obtained contains 57.6% CaS and 22.7% metallic iron. Under the precipitation conditions of Example 7, this product precipitates 0.80 gram of copper per gram of product consumed.

A higher reaction temperature is required in preparing the reduced precipitant than is used in preparing the unreduced precipitant in order to obtain satisfactory results. Tests show that with a temperature of less than about 1600° F. for three hours the resulting product, prepared in all other respects as described in Example 18, demonstrates no greater effect in precipitating the copper than was obtained with unreduced precipitant. Examples 19–23 are set forth in Table II for purposes of comparison. These examples were carried out as described in Example 18 except that the temperature and heating time are shown in Table II opposite each example as is also the amount of copper in grams precipitated per gram of reaction product consumed.

*Table II*

| Ex. No. | Temp., °F. | Heating Time, Hrs. | Percent CaS | Percent Metallic Iron in Product | Precipitating Value, gms. Cu/gm. Product |
|---|---|---|---|---|---|
| 19 | 1,500 | 1 | 37.6 | 7.9 | 0.45 |
| 20 | 1,650 | 3 | 52.9 | 17.2 | 0.68 |
| 21 | 1,800 | 3 | 63.0 | 26.5 | 0.77 |
| 22 | 2,100 | 3 | 66.6 | 26.5 | 0.82 |
| 23 | 2,400 | 3 | 66.8 | 27.2 | 0.87 |

EXAMPLE 24

This example describes the preparation of a reduced precipitant from a mixture of lime, pyrite, and coal.

A mixture identical to that of Example 18, except that it contains 13% by weight of coal in place of the charcoal, is heated and cooled in identical fashion. The coal utilized is a soft coal containing 14% ash. The reaction product contains 58.2% CaS and 23.5% metallic iron and precipitates 0.84 gram of copper per gram of product consumed under the precipitation conditions of Example 7.

EXAMPLE 25

This example describes the preparation of a reduced precipitant from a mixture of lime and pyrite employing hydrogen as a reducing agent.

The feed mixture of Example 7 is prepared as described in Example 7 and heated at 1800° F. for three hours in a sealed electrically heated furnace in a reducing atmosphere of hydrogen. The reaction product obtained, after being ground to pass a 100 mesh screen, precipitates 0.61 gram of copper per gram of product consumed under the precipitation conditions of Example 7.

EXAMPLE 26

This example describes the preparation of a reduced precipitant from a mixture of lime and pyrite employing natural gas as a reducing agent.

The feed mixture is prepared and treated as described in Example 25 but heating is carried out in a reducing atmosphere of natural gas. Under the same conditions as in Example 25, the ground reaction product serves to precipitate 0.73 gram of copper per gram of reaction product consumed.

EXAMPLE 27

In another illustration of the preferred embodiment of the invention demonstrating application of the process to a copper ore when the unreduced type precipitant is employed, the starting ore contains 1.05% total copper, 0.19% non-sulfide copper, 5.36% pyrite, with the remaining gangue being silica in the form of quartz, feldspar and clay. The ore is passed through a crusher set at ¼ inch and is mixed with dilute sulfuric acid solution in an amount equivalent to eight pounds of sulfuric acid per ton of ore, together with enough water to provide a final moisture content of 8% by weight. The moistened ore is discharged into a bin of such size that normal residence time therein is one to two hours, at which time the moistened ore is withdrawn from the bin via a belt conveyor and discharged into a mixing vessel of the paddlescrew mixer type. As it enters the mixer, the ore is diluted with water to 75% solids by weight. At this point the pH of the resulting slurry is 1.5. Midway between the feed and discharge points of the paddlescrew mixer a precipitant of the unreduced type herein described is added in an amount equivalent to 7.0 pounds per ton of ore.

The mixture of leached ore and precipitated copper as it leaves the paddlescrew mixer has a pH of 2.0 and is discharged into a conventional ball mill and classifier grinding circuit in which milk of lime is added to achieve the desired flotation alkalinity. Further processing is carried out by usual flotation procedures employing the reagents of Example 2.

Copper extraction is 86.5% in a concentrate analyzing 16.1% copper. When an identical sample of the same ore is treated by conventional flotation procedures employing the same reagents, but omitting the leaching and precipitation steps, copper extraction is only 78.4% in a concentrate analyzing 14.4% copper.

In addition to controlling the temperature at which the feed mixture is heated to prepare the unreduced and the reduced precipitants, it is also necessary to control carefully the proportions of pyrite and lime (CaO) in the feed mixture. As has been pointed out hereinabove, the mole ratio of pyrite to CaO is preferably maintained in the range of about 0.40 to 0.50. This proportion of pyrite and CaO is necessary in order to achieve a precipitant having a minimum precipitating value of 0.35 gram of copper per gram of reaction product consumed under the conditions specified. Increasing or decreasing the relative proportion of lime used as compared to the pyrite content, results in a reduction in the precipitating value of the reaction product obtained. For example, with a mole ratio of $FeS_2$ to CaO of 0.3 the resulting product has a precipitating value of about 0.30 gram of copper per gram of product consumed. Again, with a mole ratio of $FeS_2$ to CaO of 0.75, the precipitating value of the product obtained is also about 0.3. A further increase in the proportion of $FeS_2$ to CaO to a mole ratio of 1 results in a product having a precipitating value of only about 0.22.

It is to be noted that throughout this application, unless otherwise indicated, compositions and proportions when indicated as a percent are to be read as percent by weight. The expression "moisture content" is intended to include all of the liquid associated with the mass as distinguished from the solids present.

The terms and expressions employed are used as terms of description and not of limitation, and it is not intended in the use of such terms and expressions, to exclude any equivalents of the features shown and described or portions thereof, but it is recognized that various modifications are possible within the scope of the invention claimed.

What is claimed is:

1. In the process for the recovery of a metal from its ore, the steps comprising forming an aqueous slurry having a density suitable for grinding and a pH of about 1.0 to about 2.0 and in which part of said metal is soluble, adding to said slurry a precipitant the major constituent of which is calcium sulfide, said calcium sulfide being effective in less than about three minutes to precipitate substantially all of said metal as a sulfide from solution in said slurry, agitating said slurry to which said precipitant has been added, and then separating by flotation the thus-formed precipitate together with sulfide of the metal originally present in the ore from the remaining solids in said slurry.

2. In the process for the recovery of a metal from its ore, the steps comprising treating the ore with an aqueous acid leaching solution to form a slurry having a density suitable for grinding and having a pH of about 1.0 to about 2.0 and in which substantially all of said metal soluble in the leaching solution is dissolved, adding to said slurry a precipitant the major constituent of which is calcium sulfide and metallic iron, said calcium sulfide and metallic iron being effective in less than about three minutes to precipitate substantially all said dissolved metal as free metal and its sulfide, agitating the slurry to which the precipitant has been added, and simultaneously separating by flotation said precipitated metal and sulfide and the sulfide of the metal originally present in said ore from the remaining solids in said slurry.

3. In a process for the recovery of acid soluble copper minerals associated with sulfide copper minerals and acid insoluble minerals in an ore, the steps comprising crushing said ore, moistening the crushed ore with an aqueous leaching solution of sulfuric acid in sufficient quantity to form a pulp the moisture content of which is less than that at which the liquid tends to separate from the bulk of the solid ore under the influence of gravity and in which the quantity of sulfuric acid in relation to the acid consuming capacity of the ore is such that when the pulp is diluted by the further addition of water to the density of a grinding slurry the slurry will have a residual free acid content with a pH of about 1.0 to about 2.0, storing the pulp while maintaining it free of substantial agitation for about one hour so that substantially all of the acid soluble copper minerals are dissolved, diluting the pulp with water to form a slurry having a density suitable for grinding and a pH of about 1.0 to about 2.0, adding a precipitant to the slurry to precipitate the dissolved copper, and then separating the precipitated copper and the sulfide copper originally present in the ore from the remainder thereof.

4. In a process for the recovery of a metal from its ore, the steps comprising moistening the ore with an aqueous acid leaching solution in sufficient quantity to form a pulp the moisture content of which is no more than about 20% and in which the quantity of acid in relation to the acid consuming capacity of the ore is such that when the pulp is diluted by the further addition of water to the density of a grinding slurry the slurry will have a residual free acid content with a pH of about 1.0 to 2.0, leaving the leaching solution in contact with the ore long enough for substantially all of said metal soluble in the leaching solution to dissolve, diluting the pulp with water to form a slurry having a density suitable for grinding and a pH of about 1.0 to 2.0, adding calcium sulfide to the slurry and agitating it to precipitate said dissolved metal as the sulfide of the metal, and simultaneously separating by flotation said precipitated sulfide and the sulfide of the metal originally present in said ore from the remaining solids in said slurry.

5. In a process for the recovery of acid soluble copper minerals associated with sulfide copper minerals and acid insoluble minerals in an ore, the steps comprising crushing said ore, moistening the crushed ore with an aqueous leaching solution of sulfuric acid in sufficient quantity to form a pulp the moisture content of which is about 8% and in which the quantity of sulfuric acid in relation to the acid consuming capacity of the ore is such that when the pulp is diluted by the further addition of water to the density of a grinding slurry the slurry will have a residual free acid content with a pH of about 1.0 to about 2.0, storing the pulp while maintaining it free of substantial agitation for about one hour so that substantially all of the acid soluble copper minerals are dissolved, diluting the pulp with water to form a slurry having a density suitable for grinding and a pH of about 1.0 to about 2.0, adding calcium sulfide to the slurry and agitating it to precipitate dissolved copper as copper sulfide, and then recovering the precipitated copper sulfide together with the copper sulfide originally present in said ore.

6. The process of claim 5 wherein said slurry to which the calcium sulfide has been added is agitated for about three minutes, and the precipitated copper sulfide and the copper sulfide originally present in said ore are simultaneously separated from the remaining solids in said slurry by flotation.

7. The process of claim 6 wherein the flotation of the copper sulfide is carried out with the slurry having a pH less than 7.

8. The process of claim 5 wherein the amount of calcium sulfide added to the slurry is close to but greater than the amount stoichiometrically required to precipitate all of the acid soluble copper present in said ore.

9. In a process for the recovery of acid soluble copper minerals associated with sulfide copper minerals and acid insoluble minerals in an ore, the steps comprising crushing said ore, moistening the crushed ore with an aqueous leaching solution of sulfuric acid in sufficient quantity to form a pulp the moisture content of which is about 8% and in which the quantity of sulfuric acid in relation to the acid consuming capacity of the ore is such that when the pulp is diluted by the further addition of water to the density of a grinding slurry the slurry will have a residual free acid content with a pH of about 1.0 to about 2.0, storing the pulp while maintaining it free of substantial agitation for about one hour so that substantially all of the acid soluble copper minerals are dissolved, diluting the pulp with water to form a slurry having a density suitable for grinding and a pH of about 1.0 to about 2.0, adding calcium sulfide and metallic iron to the slurry and agitating it to precipitate dissolved copper as copper sulfide and metallic copper, and then recovering the precipitated copper and copper sulfide together with the copper sulfide originally present in said ore.

10. In a process for the recovery of copper from its ore, the steps comprising moistening the ore with an aqueous leaching solution of sulfuric acid in sufficient quantity to form a pulp the moisture content of which is no more than about 20% and in which the quantity of sulfuric acid in relation to the acid consuming capacity of the ore is such that when the pulp is diluted by the further addition of water to the density of a grinding slurry the slurry will have a residual free acid content with a pH of about 1.0 to about 2.0, permitting the pulp to remain undisturbed by agitation for a sufficient time so that substantially all of the copper soluble in the leaching solution is dissolved, diluting the pulp with water to form a slurry having a density suitable for grinding and a pH of about 1.0 to about 2.0, then adding to the slurry to precipitate the dissolved copper a reaction product formed by heating at a temperature of at least about 1500° F. a mixture containing pyrite and lime in the proportions of about one mole of pyrite to two moles of lime, and then separating the precipitated copper and the sulfide copper originally present in the ore from the remainder thereof.

11. In a process for the recovery of copper from its ore, the steps comprising moistening the ore with an aqueous leaching solution of sulfuric acid in sufficient quantity to form a pulp the moisture content of which is no more than about 20% and in which the quantity of sulfuric acid in relation in the acid consuming capacity of the ore is such that when the pulp is diluted by the further addition of water to the density of a grinding slurry the slurry will have a residual free acid content with a pH of about 1.0 to about 2.0, permitting the pulp to remain undisturbed by agitation for a sufficient time so that substantially all of the copper soluble in the leaching solution is dissolved, diluting the pulp with water to form a slurry having a density suitable for grinding and a pH of about 1.0 to about 2.0, forming a mixture containing pyrite and lime in the proportions of about 1 mole of pyrite to 2 moles of lime, heating the mixture of pyrite and lime at a temperature of at least 1500° F. to form a reaction product containing calcium sulfide as its major constituent, then adding said reaction product to the slurry to precipitate the dissolved copper, and then separating the precipitated copper and the sulfide copper originally present in the ore from the remainder thereof.

12. In a process for the recovery of copper from its ore, the steps comprising moistening the ore with an aqueous leaching solution of sulfuric acid in sufficient quantity to form a pulp the moisture content of which is no more than about 20% and in which the quantity of sulfuric acid in relation to the acid consuming capacity of the ore is such that when the pulp is diluted by the further addition of water to the density of a grinding slurry the slurry will have a residual free acid content with a pH of about 1.0 to about 2.0, permitting the pulp to remain undisturbed by agitation for a sufficient time so that substantially all of the copper soluble in the leaching solution is dissolved, diluting the pulp with water to form a slurry having a density suitable for grinding and a pH of about 1.0 to about 2.0, forming a mixture containing pyrite, lime and a carbon bearing material with the pyrite and lime in the proportions of about 1 mole of pyrite to 2 moles of lime, heating the mixture of pyrite, lime and the carbon bearing material at a temperature of at least about 1800° F. under non-oxidizing conditions to form a reaction product containing calcium sulfide and metallic iron as its major constituents, then adding said reaction product to the slurry to precipitate the dissolved copper, and then separating the precipitated copper and the sulfide copper originally present in the ore from the remainder thereof.

13. In a process for the recovery of copper from an ore containing acid soluble copper minerals associated with sulfide copper minerals and acid insoluble gangue minerals, the steps comprising moistening the ore with an aqueous leaching solution of sulfuric acid in sufficient quantity to form a pulp the moisture content of which is less than that at which the liquid tends to separate from the bulk of the ore solids under the influence of gravity and in which the quantity of sulfuric acid in relation to the acid consuming capacity of the ore is such that when the pulp is diluted by the further addition of water to the density of a grinding slurry the slurry will have a residual free acid content with a pH of about 1.0 to 2.0, permitting the pulp to remain undisturbed by agitation for a sufficient time so that substantially all of the copper soluble in said solution is dissolved, diluting the pulp with water to form a slurry having a density suitable for grinding and a pH of about 1.0 to 2.0, adding to the slurry as a precipitant a reaction product formed by mixing together lime and pyrite in the proportion of about 1 mole of pyrite to 2 moles of lime and heating the mixture for about one to three hours at a temperature of at least 1500° F. in a non-oxidizing atmosphere, said reaction product containing calcium sulfide as its major constituent, agitating the slurry to which the precipitant has been added for about three minutes to precipitate the dissolved copper as copper sulfide, grinding said slurry, then subjecting the ground slurry containing together both the precipitated copper and the copper sulfide minerals originally present in said ore to froth flotation and recovering a concentrate containing both the precipitated copper and the originally present copper sulfide minerals.

14. In a process for the recovery of copper from an ore containing acid soluble copper minerals associated with sulfide copper minerals and acid insoluble gangue minerals, the steps comprising moistening the ore with an aqueous leaching solution of sulfuric acid in sufficient quantity to form a pulp the moisture content of which is less than that at which the liquid tends to separate from the bulk of the ore solids under the influence of gravity and in which the quantity of sulfuric acid in relation to the acid consuming capacity of the ore is such that when the pulp is diluted by the further addition of water to the density of a grinding slurry the slurry will have a residual free acid content with a pH of about 1.0 to 2.0, permitting the pulp to remain undisturbed by agitation for a sufficient time so that substantially all of the copper soluble in said solution is dissolved, diluting the pulp with water to form a slurry having a density suitable for grinding and a pH of about 1.0 to 2.0, adding to the slurry as a precipitant a reaction product formed by mixing together pyrite, lime and a carbon bearing material with the lime and pyrite in the proportion of about 1 mole of pyrite to 2 moles of lime and heating the mixture for about one to three hours at a temperature of at least about 1800° F. under non-oxidizing conditions, said reaction product containing calcium sulfide and metallic iron as its major constituents, agitating the slurry to which the precipitant has been added for about three minutes to precipitate the dissolved copper as copper sulfide and metallic copper, grinding said slurry, then subjecting to froth flotation the ground slurry containing together both the precipitated copper and the copper sulfide minerals originally present in said ore, and recovering a concentrate containing both the precipitated copper and the originally present copper sulfide minerals.

15. In a process for the recovery of copper from an ore containing acid soluble copper minerals associated with sulfide copper minerals and acid insoluble gangue minerals, the steps comprising treating the ore with an aqueous acid leaching solution to form a slurry having a density suitable for grinding and a pH of about 1.0 to 2.0, adding to the slurry as a precipitant a reaction product formed by mixing together lime and pyrite in the proportion of about 1 mole of pyrite to 2 moles of lime and heating the mixture for about one to three hours at a temperature of at least 1500° F. in a non-oxidizing atmosphere, agitating the slurry to which the precipitant has been added, said reaction product containing calcium sulfide as its major constituent and being effective in less than about three minutes to precipitate substantially all the copper as copper sulfide from solution in said slurry, grinding the ore slurry, and then simultaneously separating the precipitated copper and the copper sulfide minerals originally present in the ore from the gangue minerals present by froth flotation.

16. In a process for the recovery of copper from an ore containing acid soluble copper minerals associated with sulfide copper minerals and acid insoluble gangue minerals, the steps comprising treating the ore with an aqueous acid leaching solution to form a slurry having a density suitable for grinding and a pH of about 1.0 to 2.0, adding to the slurry as a precipitant a reaction product formed by mixing together pyrite, lime and a carbon bearing material with the lime and pyrite in the proportion of about 1 mole of pyrite to 2 moles of lime and heating the mixture for about one to three hours at a temperature of at least about 1800° F. under non-oxidizing conditions, agitating the slurry to which the precipitant has been added, said reaction product containing calcium sulfide and metallic iron as its major constituents and being effective in less than about three minutes to precipitate substantially all the copper from solution in said slurry as copper sulfide and metallic copper, grinding the ore slurry, and then simultaneouly separating the precipitated copper and the copper sulfide minerals originally present in the ore from the gangue minerals therein by froth flotation.

17. In a process for preparing a precipitant for use in the recovery of copper from its ore, the steps comprising forming a mixture containing pyrite and lime in the proportions of about one mole of pyrite to two moles of lime, and heating said mixture at a temperature of at least about 1500° F. to form a reaction product containing calcium sulfide as its major constituent.

18. In a process for preparing a precipitant for use in the recovery of copper from its ore, the steps comprising forming a mixture containing pyrite and lime in the proportions of about one mole of pyrite to two moles of lime, and heating said mixture under non-oxidizing conditions for about one to three hours at a temperature of at least about 1500° F. to form a reaction product containing calcium sulfide as its major constituent.

19. In a process for preparing a precipitant for use in the recovery of copper from its ore, the steps comprising forming a mixture containing pyrite, lime and a carbon bearing material with the pyrite and lime in the proportions of about one mole of pyrite to two moles of lime, and heating said mixture at a temperature of at least about 1800° F. under non-oxidizing conditions to form a reaction product containing calcium sulfide and metallic iron as its major constituents.

20. In a process for preparing a precipitant for use in the recovery of copper from its ore, the steps comprising forming a mixture containing pyrite, lime and a carbon bearing material with the pyrite and lime in the proportions of about one mole of pyrite to two moles of lime and with the carbon content of the mixture being about 10% thereof, and heating said mixture for about one to three hours at a temperature of at least about 1800° F. in the presence of a reducing agent to form a reaction product containing calcium sulfide and metallic iron as its major constituents.

References Cited in the file of this patent
UNITED STATES PATENTS

| | | |
|---|---|---|
| 1,169,093 | Petinot | Jan. 18, 1916 |
| 1,269,418 | Gahl | June 11, 1918 |
| 1,333,688 | Sulman et al. | Mar. 16, 1920 |
| 1,360,666 | Mills | Nov. 30, 1920 |
| 2,716,600 | Frick et al. | Aug. 30, 1955 |